United States Patent [19]

Yoshinaga et al.

[11] Patent Number: 4,839,723
[45] Date of Patent: Jun. 13, 1989

[54] TV CAMERA

[75] Inventors: Jun Yoshinaga, Hino; Nobuyoshi Yazawa, Hachioji, both of Japan

[73] Assignee: Olympus Optical Co., Ltd., Tokyo, Japan

[21] Appl. No.: 48,059

[22] Filed: May 11, 1987

[30] Foreign Application Priority Data

May 15, 1986 [JP] Japan ................................ 61-111129

[51] Int. Cl.$^4$ .............................................. H04N 7/18
[52] U.S. Cl. ..................... 358/98; 358/229; 354/62
[58] Field of Search ............. 358/229, 98; 354/62; 128/4, 1, 11

[56] References Cited

U.S. PATENT DOCUMENTS

| | | | |
|---|---|---|---|
| 4,369,767 | 1/1983 | Shishido | 354/62 |
| 4,413,278 | 11/1983 | Feinbloom | 354/62 |
| 4,439,030 | 3/1984 | Ueda | 354/62 |
| 4,561,429 | 12/1985 | Sato et al. | 354/62 |
| 4,600,938 | 7/1986 | Sluyter et al. | 358/229 |
| 4,600,939 | 7/1986 | Sluyter et al. | 358/229 |
| 4,600,940 | 7/1986 | Sluyter | 358/229 |
| 4,639,772 | 1/1987 | Sluyter et al. | 358/229 |

FOREIGN PATENT DOCUMENTS

| | | | |
|---|---|---|---|
| 0087033 | 8/1983 | European Pat. Off. | 358/98 |
| 1097617 | 1/1961 | Fed. Rep. of Germany . | |
| 3105536 | 12/1981 | Fed. Rep. of Germany . | |

OTHER PUBLICATIONS

Ammann, F., "Technische Endoskopie", Technical Publishing House Resch KG, 1984, pp. 8, 81 to 88.

Primary Examiner—Russell E. Adams
Attorney, Agent, or Firm—Frishauf, Holtz, Goodman & Woodward

[57] ABSTRACT

A TV camera of this invention is adapted to be attached to an eyepiece section of, for example, an endoscope. The camera has a camera body with an eyepiece section. A camera mount is attached to the front portion of the inside of the casing so that the camera body is mounted on the eyepiece section of the endoscope. A beam splitter is arranged behind the camera mount to allow light which has been incident into the camera body to be split into two beams of one and the other beam. An image pickup element block includes an image pickup element for receiving the light conducted in the light incident direction and an optical system for projecting the beam travelling in the beam-incident direction onto the receiving surface of the image pickup element where an image is formed. The element block is mounted on the rear side of the beam splitter such that it is detachable from the camera body. A finder optical system is disposed parallel to the image pickup block to conduct the other beam to the eyepiece section of the camera body. It is possible to exchange an initially attached image pickup element with another image pickup element of a different size by replacing only the image pickup element block without replacing the finder optical system.

12 Claims, 2 Drawing Sheets

TV CAMERA

BACKGROUND OF THE INVENTION

1. Field of the Invention

This invention relates to a TV camera adapted to be attached to an eyepiece section of, for example, an endoscope.

2. Description of the Prior Art

A TV camera for an endoscope is known which is adapted to be attached to an eyepiece section of the endoscope with an image pickup element incorporated therein so that the body cavity of a human subject can be observed. A typical TV camera body for an endoscope includes a camera body with an image pickup element incorporated therein and the eyepiece section of the camera is mounted at the rear of the camera body for the operator to view the body cavity of a subject through the endoscope. A lens frame is mounted at the front portion of the camera body and equipped with a camera mount detachable from the eyepiece section of the endoscope. An image pickup optical system has a plurality of optical lenses and is mounted on a lens frame. A beam splitter is arranged behind the image pickup optical system to split light which has been incident thereto from the endoscope into a beam conducted to a receiving surface of an image pickup element and a beam conducted into a finder optical system which is coupled to the eyepiece section of the camera. Since the beam splitter for the finder is arranged at the rear of the image pickup optical system, the observation image of the endoscope is observed necessarily through the image pickup optical system and through finder optical system.

With the recent marked advance of the image pickup element, image pickup elements of excellent performance have been developed one after another, so that it is often necessary to replace the image pickup element of the one size with the image pickup element of another size. In order to replace an initially attached image pickup element with another new image pickup element of excellent perormance, it is necessary to replace the image pickup optical system so that a TV image or a finder image of a perperly matched size can be observed by the viewer. In the observation of the internal organs of a subject through the endoscope the operator views their image either through the eyepiece section of the endoscope or through the finder, i.e., from the eyepiece section of the camera. In this case it is desired that an image of the same size can be viewed through both the aforementioned eyepiece sections. When, therefore, the image pickup optical system is to be replaced on the typical TV camera for the endoscope, then it is necessary to make a design modification of all the the finder optical system.

As set forth above, in order to achieve this, it is necessary to re-design the TV camera substantially wholly, taking more time in design modification and an additional cost.

SUMMARY OF THE INVENTION

It is accordingly the object of this invention to provide a TV camera which has an image pickup system and finder optical system to obtain the same size of an image both through the eyepiece section of an endoscope and through a finder, i.e., the eyepiece section of a TV camera and which has only to replace an image pickup element and image pickup optical system, as required, without replacing the finder optical system.

The object of this invention can be attained by a TV camera as set out below.

That is, the TV camera is equipped with a camera body having a casing with an eyepiece section as well as a camera mount fixed at the front portion of the inside of the casing so as to mount the camera body on the eyepiece section of the endoscope. A beam splitter is arranged behind the camera mount to split light which has been incident into the camera body into two beams. An image pickup element block is mounted at the rear of the beam splitter and is detachable from the camera body. It is equipped with an image pickup element for receiving one of the beams passing in the light incident direction and an optical system for allowing the beam which has been incident into the camera body to be projected as an image on the receiving surface of the image pickup element. The TV camera further includes a finder optical system for conducting the other beam to the eyepiece section of the camera body.

In the TV camera of this invention, it is possible to replace an initially attached image pickup element of one size with another image pickup element of another size by replacing only the image pickup element block without replacing the finder optical system. As a result, the same size of an image can be observed through the eyepiece section of the camera even if the image pickup element is so replaced.

In the TV camera of this invention the exchange of the initially attached image pickup element for another new image pickup element can be implemented quickly at low costs.

DETAILED DESCRIPTION OF THE PREFERRED EMBODIMENTS

A TV camera according to the embodiment of this invention will be explained below with reference to the drawings.

Figure 1:
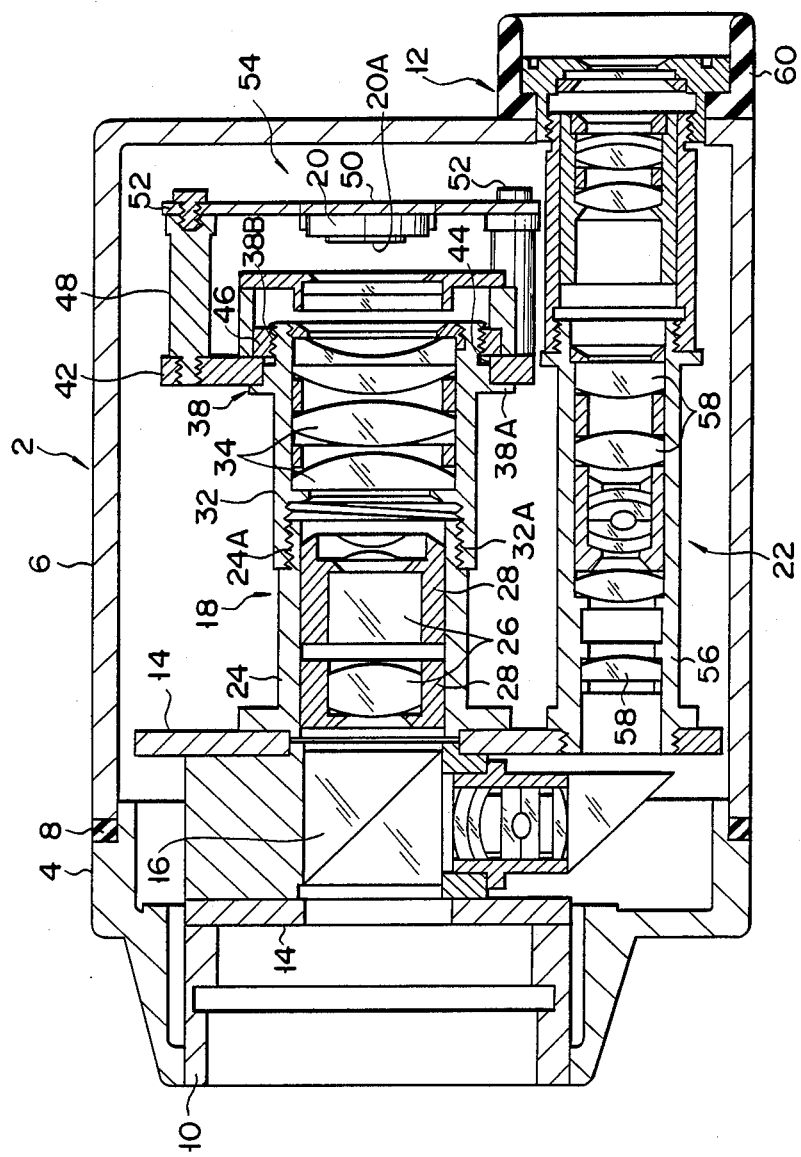
FIG. 1 is a longitudinal cross-sectional view showing a TV camera according to a first embodiment of this invention.
Figure 2:
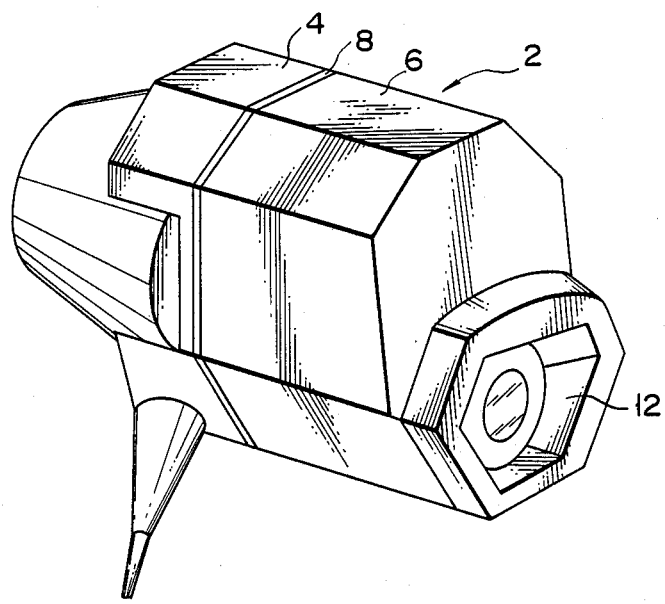
FIG. 2 is a perspective view showing the TV camera in FIG. 1.

FIGS. 1 and 2 show the TV camera according to the first embodiment of this invention. As shown in FIG. 2 the TV camera includes TV camera body 2 having front cover 4, rear cover 6 and packing 8 placed between covers 4 and 6. As shown in FIG. 1, an eyepiece section, not shown, of an endoscope is mounted inside front cover 4. Camera mount 10 is detachably mounted at the front side of the TV camera and eyepiece 12 of the TV camera is provided at the rear side of rear cover 6. Retaining frame 14 is attached to the base of camera mount 10 and beam splitter 16 is fixed to retaining frame 14. Beam splitter 16 is centered on an optical axis of a light beam incident from the eyepiece section of an endoscope, not shown. The light incident to TV camera is split by beam splitter 16 into two beams, one conducted to image pickup element 20 through image pickup optical system 18 and one reflected in a direction perpendicular to the light-incident direction and conducted to eyepiece section 12 of the TV camera through finder optical system 22.

Image pickup optical system 18 will be explained below.

Image pickup optical system 18 includes fixed frame 24 attached to retaining frame 14 and cylindrical lens frame 32 located at the rear of fixed frame 24. Movable frame 28 is mounted within fixed frame 24 and contains zoom lens 26. Movable frame 24 is so mounted as to be movable in the direction of the optical axis of optical system 18. External thread section 24A is formed on the outer peripheral surface portion of fixed frame 24. Internal thread section 32A is formed on the inner surface of the front end portion of lens frame 32 and inserted over external thread section 24A of fixed frame 24. Lens frame 32 is detachably mounted on fixed frame 24. A plurality of lenses 34 are mounted within lens frame 32 and attaching section 38 is formed on the outer periphery of the rear end portion of lens frame 32 and has flange 38A and external thread section 38B. Attaching plate 42 is fixed to attaching section 38 at the location of matching hole 44. Attaching plate 42 is pressed against flange 38A by fastening ring 46 and fixed at that location with fastening ring 46 threaded on external thread section 38B. A plurality of rearwardly extending support pins 48 are mounted on attaching plate 42 and printed circuit board 50 is attached by setscrew 52 to the ends of support pins 48. Image pickup element 20 is located substantially at the center of printed circuit board 50. The attaching plate 42 and pins 48 comprise a connection unit.

In this embodiment, image pickup element block 54 is comprised of lens frame 32 with the plurality of lens 34 incorporated therein, attaching plate 42 and printed circuit board 50 with image pickup element 20. Thus image pickup element block 54 is so configured that it is detachably mounted relative to fixed frame 24 in image pickup optical system 18 to permit the exchange of element block 54 for another new element block.

Finder optical system 22 is equipped with a plurality of lenses 58 incorporated within lens frame 56 of finder optical system 22 and is coupled to eyepiece section 12 of the TV camera. A finder image is transmitted by finder optical system 22 from beam splitter 16 to eyepiece section 12 for observation. Eye cup 60 of a flexible material is attached to eyepiece section 12.

The operation of the TV camera according to this invention will be explained below.

Observation image light is incident from the eyepiece section of the endoscope to TV camera body 2 and is conducted to beam splitter 16 where it is split into two beams. One of these two beams is conducted through image pickup optical system 18 to surface 20A of image pickup element 20 where a corresponding image is formed. The other beam is conducted through finder optical system 22 to eyepiece section 12. As appreciated from the above, the finder image falls onto finder optical system 22 without passing through image pickup optical system 18. Finder optical system 22 is so designed that the operator can observe an image of the same size as that of the image observed from the camera eyepiece section on the eyepiece section side of the endoscope. Even if image pickup element 20 is exchanged for another image pickup element of different size, the same image can be observed from eyepiece section 12 of the TV camera.

In the TV camera of this invention, if an initially attached image pickup element is replaced with, for example, a newly developed image pickup element of excellent performance, there is no need to replace finder optical system 22 and thus it is only necessary to replace the image pickup element block alone as one unit. At this time, image pickup element block 54 can be separated from image pickup optical system 18 by detaching lens frame 32 from fixed frame 24. Even if image pickup element 20 which has previously been mounted on the TV camera is replaced by a new one of different size, the same image can be observed from eyepiece section 12 of the TV camera through finder optical system 22 in which case the operator can observe an image which is the same as that observed from the eyepiece section side of the endoscope.

Figure 3:
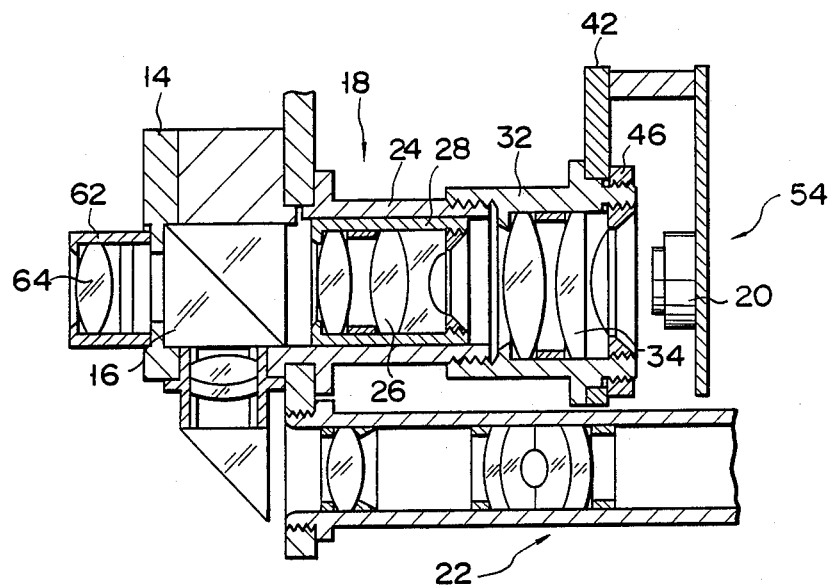
FIG. 3 is a longitudinal cross-sectional view schematically showing a TV camera according to a second embodiment of this invention.

FIG. 3 shows a TV camera according to the second embodiment of this invention. In this embodiment, lens retaining frame 62 is mounted at the front of beam splitter 16. Within lens retaining frame 62 is incorporated lens 64 which corresponds to one lens of zoom lens 26 of image pickup optical system 18 in the first embodiment. The other arrangement of the TV camera according to the second embodiment is substantially the same as the first embodiment. In the TV camera according to the second embodiment of this invention the image pickup element can readily be replaced by another image pickup element.

What is claimed is:

1. A TV camera adapted to be connected to an eyepiece section of an endoscope, comprising:
    a camera body including a casing having an eyepiece section;
    a camera mount means attached to a front portion of the inside of said casing, and for mounting the camera body on the eyepiece section of the endoscope;
    a beam splitter means arranged in said casing at a rear portion of said camera mount means for splitting light incident into said camera body into first and second beams, said first beam being conducted in a light-incident direction;
    an image pickup element block in said casing, and including:
        an image pickup element means for receiving said first beam conducted in said light-incident direction; and
        optical means for projecting said first beam as an image on a receiving surface of said image pickup element means;
        said image pickup element block being located rearwardly of said beam splitter means and forwardly of said image pickup element means, in the direction of propagation of said incident light, and said image pickup element block being detachably mounted relative to said camera body; and
    a finder optical system means in said casing, for receiving said second beam from said beam splitter means without said second beam passing through said optical means, and for conducting said second beam to said eyepiece section of said camera body;
    whereby said image pickup element means and said optical means are replaceable as a unit by replacement of said image pickup element block without replacing said finder optical system means.

2. A TV camera according to claim 1, wherein said image pickup element block is threaded onto said casing of said camera body.

3. A TV camera according to claim 1, further comprising a zoom lens arranged between said beam splitter means and said image pickup element block.

4. A TV camera according to claim 1, further comprising a zoom lens comprised of a first lens means arranged between said beam splitter means and said image pickup element block, and a second lens means arranged on a front side of said beam splitter means.

5. A TV camera according to claim 1, wherein:
said camera body includes a retaining frame means for retaining said beam splitter means, and a fixed frame means for receiving a zoom lens therein, said fixed frame means having one end attached to a rear surface of said retaining frame means and another end having an external threaded section; and
said image pickup element block further comprising a cylindrical lens frame having a plurality of lenses and having an internal threaded section at one end so as to be insertable over said external threaded section of said fixed frame means, a printed circuit board with said image pickup element means centered thereon, and a connection unit having a plurality of support means for connecting said printed circuit board to a rear end of said lens frame with a predetermined spacing between said printed circuit board and said rear end of said lens frame.

6. A TV camera according to claim 1, wherein said finder optical system means is disposed substantially parallel to said image pickup element block.

7. A TV camera adapted to be connected to an eyepiece section of an endoscope, comprising:
a camera body including a casing having an eyepiece section;
a camera mount means attached to a front portion of the inside of said casing, and for mounting the camera body on the eyepiece section of the endoscope;
a beam splitter means arranged at a rear portion of said camera mount means for splitting light incident into said camera body into first and second beams, said first beam being conducted in a light-incident direction;
an image pickup element block including:
an image pickup element means for receiving said first beam conducted in said light-incident direction; and
optical means for producing said first beam as an image on a receiving surface of said image pickup element means;
said image pickup element block being located on a rear side of said beam splitter means and being detachably mounted relative to said camera body;
a zoom lens arranged between said beam splitter means and said image pickup element block; and
a finder optical system means for conducting said second beam from said beam splitter means to said eyepiece section of said camera body.

8. A TV camera according to claim 7, wherein said finder optical system means is disposed substantially parallel to said image pickup element block.

9. A TV camera adapted to be connected to an eyepiece section of an endoscope, comprising:
a camera body including a casing having an eyepiece section;
a camera mount means attached to a front portion of the inside of said casing, and for mounting the camera body on the eyepiece section of the endoscope;
a beam splitter means arranged at a rear portion of said camera mount means for splitting light incident into said camera body into first and second beams, said first beam being conducted in a light-incident direction;
an image pickup element block including:
an image pickup element means for receiving said first beam conducted in said light-incident direction; and
optical means for projecting said first beam as an image on a receiving surface of said image pickup element means;
said image pickup element block being located on a rear side of said beam splitter means and being detachably mounted relative to said camera body;
a zoom lens comprised of a first lens means arranged between said beam splitter means and said image pickup element block, and a second lens means arranged on a front side of said beam splitter means; and
a finder optical system means for conducting said second beam from said beam splitter means to said eyepiece section of said camera body.

10. A TV camera according to claim 9, wherein said finder optical system means is disposed substantially parallel to said image pickup element block.

11. A TV camera adapted to be connected to an eyepiece section of an endoscope comprising:
a camera body including a casing having an eyepiece section;
a camera mount means attached to a front portion of the inside of said casing, and for mounting the camera body on the eyepiece section of the endoscope;
a beam splitter means arranged at a rear portion of said camera mount means for splitting light incident into said camera body into first and second beams, said first beam being conducted in a light-incident direction;
an image pickup element block including:
an image pickup element means for receiving said first beam conducted in said light-incident direction; and
optical means for projecting said first beam as an image on a receiving surface of said image pickup element means;
said image pickup element block being located on a rear side of said beam splitter means and being detachably mounted relative to said camera body;
a zoom lens arranged between said beam splitter means and said image pickup element block;
a finder optical system means for conducting said second beam from said beam splitter means to said eyepiece section of said camera body;
said camera body having a retaining frame means for retaining said beam splitter means, and a fixed frame means for receiving a zoom lens therein, said fixed frame means having one end attached to a rear surface of said retaining frame means and another end having an external threaded section; and
said image pickup element block further comprising a cylindrical lens frame having a plurality of lenses and having an internal threaded section at one end so as to be insertable over said external threaded section of said fixed frame means, a printed circuit board with said image pickup element means centered thereon, and a connection unit having a plurality of support means for connecting said printed circuit board to a rear end of said lens frame with a predetermined spacing between said printed circuit board and said rear end of said lens frame.

12. A TV camera according to claim 11, wherein said finder optical system means is disposed substantially parallel to said image pickup element block.

* * * * *